US008522758B2

(12) United States Patent
Bromberg et al.

(10) Patent No.: US 8,522,758 B2
(45) Date of Patent: Sep. 3, 2013

(54) MINIMIZING ALCOHOL USE IN HIGH EFFICIENCY ALCOHOL BOOSTED GASOLINE ENGINES

(75) Inventors: Leslie Bromberg, Sharon, MA (US); Daniel R. Cohn, Cambridge, MA (US)

(73) Assignee: Ethanol Boosting Systems, LLC, Cambridge, MA (US)

( * ) Notice: Subject to any disclaimer, the term of this patent is extended or adjusted under 35 U.S.C. 154(b) by 861 days.

(21) Appl. No.: 12/555,911

(22) Filed: Sep. 9, 2009

(65) Prior Publication Data

US 2010/0065016 A1    Mar. 18, 2010

Related U.S. Application Data

(60) Provisional application No. 61/096,604, filed on Sep. 12, 2008.

(51) Int. Cl.
*F02B 7/00*    (2006.01)
*F02B 13/00*   (2006.01)
*F02M 43/00*   (2006.01)

(52) U.S. Cl.
USPC ............................ 123/577; 123/304; 123/575

(58) Field of Classification Search
USPC ................... 123/1 A, 304, 575, 25 C, 25 GE, 123/198 A, 295, 299, 300, 305, 406.29, 406.3, 123/406.31, 405.34, 406.37, 431, 435, 436, 123/577; 701/103, 104, 105, 110, 111
See application file for complete search history.

(56) References Cited

U.S. PATENT DOCUMENTS

| | | | |
|---|---|---|---|
| 2,741,230 A | 4/1956 | Reynolds | |
| 3,089,470 A | 5/1963 | Payne | |
| 3,106,194 A | 10/1963 | Cantwell, Jr. et al. | |
| 3,557,763 A | 1/1971 | Probst | |
| 3,822,119 A | 7/1974 | Frech et al. | |
| 4,031,864 A | 6/1977 | Crothers | |
| 4,056,087 A | 11/1977 | Boyce | |
| 4,182,278 A | 1/1980 | Coakwell | |
| 4,216,744 A | 8/1980 | Oswald et al. | |
| 4,230,072 A | 10/1980 | Noguchi et al. | |
| 4,312,310 A | 1/1982 | Chivilo et al. | |
| 4,402,296 A | 9/1983 | Schwarz | |

(Continued)

OTHER PUBLICATIONS

Office Action—Restriction—mailed Apr. 24, 2012 in co-pending U.S. Appl. No. 12/701,034.

(Continued)

*Primary Examiner* — Stephen K Cronin
*Assistant Examiner* — Sizo Vilakazi
(74) *Attorney, Agent, or Firm* — Nields, Lemack & Frame, LLC

(57) ABSTRACT

A number of systems and methods are disclosed which increase the replenishment interval for anti-knock fluid. This is especially important during activities which require a large amount of anti-knock fluid, such as towing. In some embodiments, the systems and methods are used to reduce anti-knock fluid consumption. For example, changes to engine operation, such as rich operation, spark retarding, upspeeding, and variable valve timing, all serve to reduce the amount of anti-knock fluid required to eliminate knocking. In other embodiments, the composition of the anti-knock fluid is modified, such as by using a higher octane fluid, or through the addition of water to the anti-knock fluid. In other embodiments, the replenishment interval is increased through a larger anti-knock fluid storage capacity. In one embodiment, a three tank system is used where the third tank can be used to store gasoline or anti-knock fluid, depending on the driving conditions.

21 Claims, 7 Drawing Sheets

(56) References Cited

U.S. PATENT DOCUMENTS

| | | |
|---|---|---|
| 4,446,830 A | 5/1984 | Simko et al. |
| 4,480,616 A | 11/1984 | Takeda |
| 4,495,930 A | 1/1985 | Nakajima |
| 4,541,383 A | 9/1985 | Jessel |
| 4,594,201 A | 6/1986 | Phillips et al. |
| 4,596,277 A | 6/1986 | Djordjevic |
| 4,721,081 A | 1/1988 | Krauja et al. |
| 4,905,649 A | 3/1990 | Washino et al. |
| 4,958,598 A | 9/1990 | Fosseen |
| 4,967,714 A | 11/1990 | Inoue |
| 4,974,416 A | 12/1990 | Taylor |
| 4,993,386 A | 2/1991 | Ozasa et al. |
| 4,993,388 A | 2/1991 | Mitsumoto |
| 5,131,228 A | 7/1992 | Mochizuki et al. |
| 5,179,923 A | 1/1993 | Tsurutani et al. |
| 5,233,944 A | 8/1993 | Mochizuki |
| 5,497,744 A | 3/1996 | Nagaosa et al. |
| 5,526,797 A | 6/1996 | Stokes |
| 5,560,344 A | 10/1996 | Chan |
| 5,715,788 A | 2/1998 | Tarr et al. |
| 5,911,210 A | 6/1999 | Flach |
| 5,937,799 A | 8/1999 | Binion |
| 5,983,855 A | 11/1999 | Benedikt et al. |
| 6,073,607 A | 6/2000 | Liber |
| 6,076,487 A | 6/2000 | Wulff et al. |
| 6,230,683 B1 | 5/2001 | zur Loye et al. |
| 6,260,525 B1 | 7/2001 | Moyer |
| 6,287,351 B1 | 9/2001 | Wulff et al. |
| 6,298,838 B1 | 10/2001 | Huff et al. |
| 6,321,692 B1 | 11/2001 | Rayner |
| 6,332,448 B1 | 12/2001 | Ilyama et al. |
| 6,340,015 B1 | 1/2002 | Benedikt et al. |
| 6,358,180 B1 | 3/2002 | Kuroda et al. |
| 6,508,233 B1 | 1/2003 | Suhre et al. |
| 6,513,505 B2 | 2/2003 | Watanabe et al. |
| 6,536,405 B1 | 3/2003 | Rieger et al. |
| 6,543,423 B2 | 4/2003 | Dobryden et al. |
| 6,561,157 B2 | 5/2003 | zur Loye et al. |
| 6,575,147 B2 | 6/2003 | Wulff et al. |
| 6,622,663 B2 | 9/2003 | Weissman et al. |
| 6,651,432 B1 | 11/2003 | Gray, Jr. |
| 6,655,324 B2 | 12/2003 | Cohn et al. |
| 6,668,804 B2 | 12/2003 | Dobryden et al. |
| 6,725,827 B2 | 4/2004 | Ueda et al. |
| 6,745,744 B2 | 6/2004 | Suckewer et al. |
| 6,748,918 B2 | 6/2004 | Rieger et al. |
| 6,755,175 B1 | 6/2004 | McKay et al. |
| 6,799,551 B2 | 10/2004 | Nakakita et al. |
| 6,892,691 B1 | 5/2005 | Uhl et al. |
| 6,951,202 B2 | 10/2005 | Oda |
| 6,955,154 B1 | 10/2005 | Douglas |
| 6,959,693 B2 | 11/2005 | Oda |
| 6,981,487 B2 | 1/2006 | Ohtani |
| 6,990,956 B2 | 1/2006 | Niimi |
| 7,013,847 B2 | 3/2006 | Auer |
| 7,021,277 B2 | 4/2006 | Kuo et al. |
| 7,028,644 B2 | 4/2006 | Cohn et al. |
| 7,077,100 B2 | 7/2006 | Vogel et al. |
| 7,086,376 B2 | 8/2006 | McKay |
| 7,107,942 B2 * | 9/2006 | Weissman et al. ............ 123/1 A |
| 7,156,070 B2 | 1/2007 | Strom et al. |
| 7,159,568 B1 | 1/2007 | Lewis et al. |
| 7,178,503 B1 | 2/2007 | Brehob |
| 7,188,607 B2 | 3/2007 | Kobayashi |
| 7,201,136 B2 | 4/2007 | McKay et al. |
| 7,225,787 B2 * | 6/2007 | Bromberg et al. ........ 123/198 A |
| 7,302,933 B2 | 12/2007 | Kerns |
| 7,314,033 B2 | 1/2008 | Cohn et al. |
| 7,320,302 B2 | 1/2008 | Kobayashi |
| 7,370,609 B2 * | 5/2008 | Kamio ........................ 123/1 A |
| 7,389,751 B2 * | 6/2008 | Leone ......................... 123/1 A |
| 7,395,786 B2 | 7/2008 | Leone et al. |
| 7,406,947 B2 | 8/2008 | Lewis et al. |
| 7,410,514 B2 | 8/2008 | Binions |
| 7,426,908 B2 | 9/2008 | Brehob |
| 7,426,925 B2 | 9/2008 | Leone et al. |
| 7,444,987 B2 | 11/2008 | Cohn et al. |
| 7,461,628 B2 | 12/2008 | Blumberg et al. |
| 7,533,651 B2 | 5/2009 | Surnilla |
| 7,546,835 B1 | 6/2009 | Hilditch |
| 7,581,528 B2 | 9/2009 | Stein et al. |
| 7,640,913 B2 | 1/2010 | Blumberg et al. |
| 7,640,915 B2 | 1/2010 | Cohn et al. |
| 7,726,265 B2 | 6/2010 | Bromberg et al. |
| 7,740,004 B2 | 6/2010 | Cohn et al. |
| 7,762,233 B2 | 7/2010 | Cohn et al. |
| 7,841,325 B2 | 11/2010 | Cohn et al. |
| 7,971,572 B2 | 7/2011 | Cohn et al. |
| 7,981,278 B2 * | 7/2011 | Kamio et al. .................. 210/86 |
| 8,069,839 B2 | 12/2011 | Cohn et al. |
| 8,082,735 B2 | 12/2011 | Bromberg et al. |
| 8,171,915 B2 | 5/2012 | Cohn et al. |
| 2002/0014226 A1 | 2/2002 | Wulff et al. |
| 2002/0139321 A1 | 10/2002 | Weissman et al. |
| 2004/0065274 A1 | 4/2004 | Cohn et al. |
| 2005/0056264 A1 | 3/2005 | Weissman et al. |
| 2006/0102136 A1 | 5/2006 | Bromberg et al. |
| 2006/0102145 A1 | 5/2006 | Cohn et al. |
| 2006/0102146 A1 | 5/2006 | Cohn et al. |
| 2007/0039588 A1 | 2/2007 | Kobayashi |
| 2007/0119391 A1 | 5/2007 | Fried et al. |
| 2007/0119416 A1 | 5/2007 | Boyarski |
| 2007/0119421 A1 | 5/2007 | Lewis et al. |
| 2007/0125321 A1 | 6/2007 | Ritter |
| 2007/0163537 A1 * | 7/2007 | Kamio et al. .................. 123/304 |
| 2007/0215111 A1 | 9/2007 | Surnilla |
| 2008/0060612 A1 | 3/2008 | Cohn et al. |
| 2008/0168966 A1 * | 7/2008 | Bromberg et al. ............ 123/528 |
| 2008/0228232 A1 | 9/2008 | Lewis et al. |
| 2009/0043478 A1 | 2/2009 | Labonte |
| 2009/0076705 A1 | 3/2009 | Colesworthy |
| 2009/0235908 A1 * | 9/2009 | Kubo et al. .................... 123/575 |
| 2009/0308367 A1 | 12/2009 | Glugla |
| 2010/0006050 A1 | 1/2010 | Bromberg et al. |
| 2010/0112391 A1 | 5/2010 | Salloum et al. |
| 2010/0175659 A1 | 7/2010 | Cohn et al. |
| 2010/0199946 A1 | 8/2010 | Cohn et al. |
| 2010/0288232 A1 | 11/2010 | Bromberg et al. |
| 2011/0030653 A1 | 2/2011 | Cohn et al. |
| 2011/0067674 A1 | 3/2011 | Kasseris et al. |

OTHER PUBLICATIONS

Office Action mailed Jun. 14, 2012 in co-pending U.S. Appl. No. 12/701,034.
Notice of Allowance mailed Mar. 6, 2012 in U.S. Appl. No. 12/907,163 (now US Patent No. 8,171,915).
Supplemental Notice of Allowance mailed Apr. 10, 2012 in U.S. Appl. No. 12/907,163 (now US Patent No. 8,171,915).
Office Action mailed Jun. 19, 2012 in co-pending U.S. Appl. No. 12/942,133.
Combustion and Flame, 2002, V. 129: 253-280, "A Comprehensive Modeling Study of iso-Octane Oxidation", Curran, et al.
Internal Combustion Engine Fundamentals, 1988, p. 477, "Combustion in Spark Ignition Engines", Heywood.
MIT Laboratory for Energy and the Environment Report, LFEE 2005-001, Apr. 20, 2005, 11 pages, "Direct Injection Ethanol Boosted Gasoline Engines: Biofuel Leveraging for Cost Effective Reduction of Oil Dependence and CO2 Emissions", Cohn, et al.
MIT Laboratory for Energy and the Environment Report, LFEE 2006-001, Feb. 23, 2006, 17 pages, "Calculations of Knock Suppression in Highly Turbocharged Gasoline/Ethanol Engines Using Direct Ethanol Injection", Bromberg, et al.
MIT Laboratory for Energy and the Environment Report, LFEE 2008-01 RP, Jan. 6, 2008, 22 pages, "Effective Octane and Efficiency Advantages of Direct Injection Alcohol Engines", Bromberg, et al.
MIT Plasma Science and Fusion Center, PSFC/JA-07-3, Nov. 15, 2006, Revised: Mar. 15, 2007, 12 pages, "Effect of Compression Ratio and Manifold Pressure on Ethanol Utilization in Gasoline/Ethanol Engines", Bromberg, et al.
Renewable Energy, vol. 29, Issue 7, Jun. 2004, pp. 1181-1191, "The use of ethanol-gasoline blend as a fuel in an SI engine", Yuksel, et al.

Society of Automotive Engineers, Inc., SAE Technical Paper Series, No. 700887, 1970, 6 pages, "Engine Cooling by Direct Injection of Cooling Water", Modak, et al.

Society of Automotive Engineers, Inc., SAE Technical Paper Series, No. 880495, 1988, 21 pages, "Direct Injection Ignition Assisted Alcohol Engine", Lorusso, et al.

Society of Automotive Engineers, Inc., SAE Technical Paper Series, No. 982476, 1998, 11 pages, "Knock Suppression in a Turbocharged SI Engine by Using Cooled EGR", Grandin, et al.

Society of Automotive Engineers, Inc., SAE Technical Paper Series, No. 1999-01-3505, 1999, 10 pages, "Replacing Fuel Enrichment in a Turbo Charged SI Engine: Lean Burn or Cooled EGR", Grandin, et al.

Society of Automotive Engineers, Inc., SAE Technical Paper Series, No. 2001-01-1207, 2001, 11 pages, "Internal Mixture Formation and Combustion—from Gasoline to Ethanol", Stan, et al.

Society of Automotive Engineers, Inc., SAE Technical Paper Series, No. 2000-01-2902, 2000, 12 pages, "A Gasoline Engine Concept for Improved Fuel Economy—The Lean Boost System", Stokes, et al.

Society of Automotive Engineers, Inc., SAE Technical Paper Series, No. 2003-01-0542, 2003, 12 pages, "Downsizing a Gasoline Engine Using Turbocharging with Direct Injection", Lecointe, et al.

Office Action dated Feb. 8, 2011 in abandoned U.S. Appl. No. 12/562,766.

Office Action dated Nov. 24, 2010 in abandoned U.S. Appl. No. 12/562,766.

Office Action dated Sep. 16, 2011 in co-pending U.S. Appl. No. 12/844,168.

Office Action—Restriction—dated Aug. 8, 2011 in co-pending U.S. Appl. No. 12/844,168.

Office Action dated Sep. 6, 2011 in co-pending U.S. Appl. No. 12/907,163.

Office Action dated Jan. 7, 2011 in abandoned U.S. Appl. No. 12/730,662.

Office Action—Restriction—dated Dec. 10, 2010 in abandoned U.S. Appl. No. 12/730,662.

* cited by examiner

MINIMIZING ALCOHOL USE IN HIGH EFFICIENCY ALCOHOL BOOSTED GASOLINE ENGINES This application claims priority to U.S. Provisional Patent Application No. 61/096,604, filed Sep. 12, 2008, the disclosure of which is hereby incorporated by reference in its entirety.

BACKGROUND

Increasing concerns about global climate change and energy security call for cost effective new approaches to reduce use of fossil fuels in cars and other vehicles. Recent domestic legislation, as well as the Kyoto protocol for greenhouse gas reduction, set challenging goals for reduction of $CO_2$ emissions. For example, the California legislation phases in requirements for reducing $CO_2$ generation by 30% by 2015. Other states may follow California in establishing lower emission goals. While new technologies, such as electric vehicles, are being pursued, cost effective approaches using currently available technology are needed to achieve the widespread use necessary to meet these aggressive goals for reduced fossil fuel consumption. Ethanol biofuel could play an important role in meeting these goals by enabling a substantial increase in the efficiency of gasoline engines.

One method of improving traditional gasoline engine efficiency is through the use of high compression ratio operation, particularly in conjunction with smaller sized engines. The aggressive turbocharging (or supercharging) of the engine provides increased boosting of naturally aspirated cylinder pressure. This pressure boosting allows a strongly turbocharged engine to match the maximum torque and power capability of a much larger engine. Thus, the engine may produce increased torque and power when needed. This downsized engine advantageously has higher fuel efficiency due to its low friction, especially at the loads used in typical urban driving.

Engine efficiency can also be increased by use of higher compression ratio. Compression ratio is defined as the ratio of the total volume of the cylinder when the piston is at the top of its stroke, as compared to its volume when the piston is at the bottom of its stroke. Like turbocharging, this technique serves to further increase the pressure of the gasoline/air mixture at the time of combustion.

However, the use of these techniques is limited by the problem of engine knock. Knock is the undesired rapid gasoline energy release due to autoignition of the end gas, and can damage the engine. Knock most often occurs at high values of torque, when the pressure and temperature of the gasoline/air mixture exceed certain levels. At these high temperature and pressure levels, the gasoline/air mixture becomes unstable, and therefore may combust in the absence of a spark.

Octane number represents the resistance of a fuel to autoignition. Thus, high octane gasoline (for example, 93 octane number vs. 87 octane number for regular gasoline) may be used to prevent knock and allow operation at higher maximum values of torque and power. Additionally, other changes to engine operation, such as modified valve timing may also help. However, these changes alone are insufficient to fully realize the benefits of turbocharging and higher compression ratio.

The use of higher octane fuels can reduce the problem of knocking. For example, ethanol is commonly added to gasoline. Ethanol has a blending octane number of roughly 110, and is attractive since it is a renewable energy source that can be obtained using biomass. Many gasoline mixtures currently available are about 10% ethanol by volume. However, this introduction of ethanol does little to affect the overall octane of the mixture. Mixtures containing higher percentages of ethanol, such as E85, suffer from other drawbacks. Specifically, ethanol is more expensive than gasoline, and is much more limited in its supply. Thus, it is unlikely that ethanol alone will replace gasoline as the fuel for automobiles and other vehicles. Other fuels, such as methanol, also have a higher blending octane number, such as 130, but suffer from the same drawbacks listed above.

It is known that the direct injection of an anti-knock fluid having alcohol content (such as ethanol or methanol) into the cylinder has a stabilizing effect on the gasoline/air mixture and reduces the possibility of knocking. In some embodiments, the anti-knock fluid may also include gasoline and/or water. FIG. 5 shows a representative boost system.

The boost system 100 includes a spark ignition engine 105, in communication with a manifold 110. The manifold 110 receives compressed air from turbocharger 120, and gasoline from gasoline tank 130. The gasoline and air are mixed in the manifold 110, and enter the engine 105, such as through port fuel injection. A second tank 140 is used to hold anti-knock fluid, which enters the engine 105 through direct injection. Additionally, the boost system 100 includes a knock sensor 150, adapted to monitor the onset of knock. The system also includes a boost system controller 160. The boost system controller receives an input from the knock sensor 150, and based on this input, controls the release of anti-knock fluid from the second tank 140 and the release of gasoline from the gasoline tank 130. In some embodiments, the boost system controller 160 utilizes open loop control to determine the amount of gasoline and anti-knock fluid to inject into the engine 105. In another embodiment, a closed loop algorithm is used to determine the amount of anti-knock fluid, based on the knock sensor 150, and such parameters as RPM and torque.

Ethanol has a high fuel octane number (a blending octane number of 110). Moreover, appropriate direct injection of ethanol, or other alcohol-containing anti-knock fluids, can provide an even larger additional knock suppression effect due to the substantial air charge cooling resulting from its high heat of vaporization. Calculations indicate that by increasing the fraction of the fuel provided by ethanol up to 100 percent when needed at high values of torque, an engine could operate without knock at more than twice the torque and power levels that would otherwise be possible. The level of knock suppression can be greater than that of fuel with an octane rating of 130 octane numbers injected into the engine intake. The large increase in knock resistance and allowed inlet manifold pressure can make possible a factor of 2 decrease in engine size (e.g. a 4 cylinder engine instead of an 8 cylinder engine) along with a significant increase in compression ratio (for example, from 10 to 12). This type of operation could provide an increase in efficiency of 30% or more. The combination of direct injection and a turbocharger with appropriate low rpm response provide the desired response capability.

Because of the limited supply of ethanol relative to gasoline and its higher cost, and to minimize the inconvenience to the operator of refueling a second fluid, it is desirable to minimize the amount of ethanol, or alcohol-based anti-knock fluid, that is required to meet the knock resistance requirement. By use of an optimized fuel management system, the required ethanol energy consumption over a drive cycle can be kept to less than 10% of the gasoline energy consumption. This low ratio of ethanol to gasoline consumption is achieved by using the direct ethanol injection only during high values of torque where knock suppression is required and by minimizing the ethanol/gasoline ratio at each point in the drive cycle. During the large fraction of the drive cycle where the torque and power are low, the engine would use only gasoline introduced into the engine by conventional port fueling. When knock suppression is needed at high torque, the fraction of directly injected ethanol is increased with increasing torque. In this way, the knock suppression benefit of a given amount of ethanol is optimized.

In one embodiment, an anti-knock fluid, such as an alcohol (such as ethanol or methanol) or alcohol blend with water and/or gasoline, is kept in a container separate from the main gasoline tank. As shown in FIG. 5, boost fluid from a small separate fuel tank is directly injected into the cylinders (in contrast to conventional port injection of gasoline into the manifold). The concept uses the direct fuel injector technology that is now being employed in production gasoline engine vehicles. The traditional path used by the gasoline is maintained, and is used to aspirate the gasoline prior to its injection into the cylinder. In situations where knocking may occur, such as high torque or towing, the anti-knock fluid is injected directly into the cylinder. The high heat of vaporization of the boost gas reduces the temperature of the gasoline/air mixture, thereby increasing its stability. In situations where knocking is not common, such as normal highway driving, the anti-knock fluid is not used. Thus, by limiting the use of the anti-knock fluid to only those situations where knocking is prevalent, the amount of anti-knock fluid used can be minimized.

By directly injecting the anti-knock fluid into the cylinder, knocking can be significantly reduced. This allows boost ratios of 2 to 3 and compression ratios in the 11 to 14 range. A fuel efficiency increase of 20%-30% relative to port fuel injected engines can be achieved using these parameters. Alcohol boosting can provide a means to obtain rapid penetration of high efficiency engine technology in cars and light duty trucks.

As noted above, the anti-knock fluid is kept in a separate container, and therefore may need to be replenished periodically. In some embodiments, it may be necessary for the operator to perform this function. If the need to replenish the anti-knock fluid is infrequent, such as is the case of windshield wiper fluid, the inconvenience is minimal. However, if the anti-knock fluid needs to be refilled often, this may present an unacceptable solution to consumers.

Therefore, it would be advantageous if a turbocharged spark-ignited engine could be injected with anti-knock fluids that eliminate the knocking issue, while remaining low cost and readily available. The engine could operate using gasoline, natural gas or any other fluid appropriate to spark-ignited engines. Furthermore, it would be beneficial if the use of this anti-knock fluid were minimized so as to reduce the frequency of replenishment.

SUMMARY

A number of systems and methods are disclosed which increase the replenishment interval for anti-knock fluid. This is especially important during activities that require a large amount of anti-knock fluid, such as towing. In some embodiments, the systems and methods are used to reduce anti-knock fluid consumption. For example, changes to engine operation, such as rich operation, spark retarding, upspeeding, and variable valve timing, all serve to reduce the amount of anti-knock fluid required to eliminate knocking. In other embodiments, the composition of the anti-knock fluid is modified, such as by using a higher octane fluid, or through the addition of water to the anti-knock fluid. In other embodiments, the replenishment interval is increased through a larger anti-knock fluid storage capacity. In one embodiment, a three tank system is used where the third tank can be used to store gasoline or anti-knock fluid, depending on the driving conditions.

DETAILED DESCRIPTION OF THE INVENTION

Figure 1:
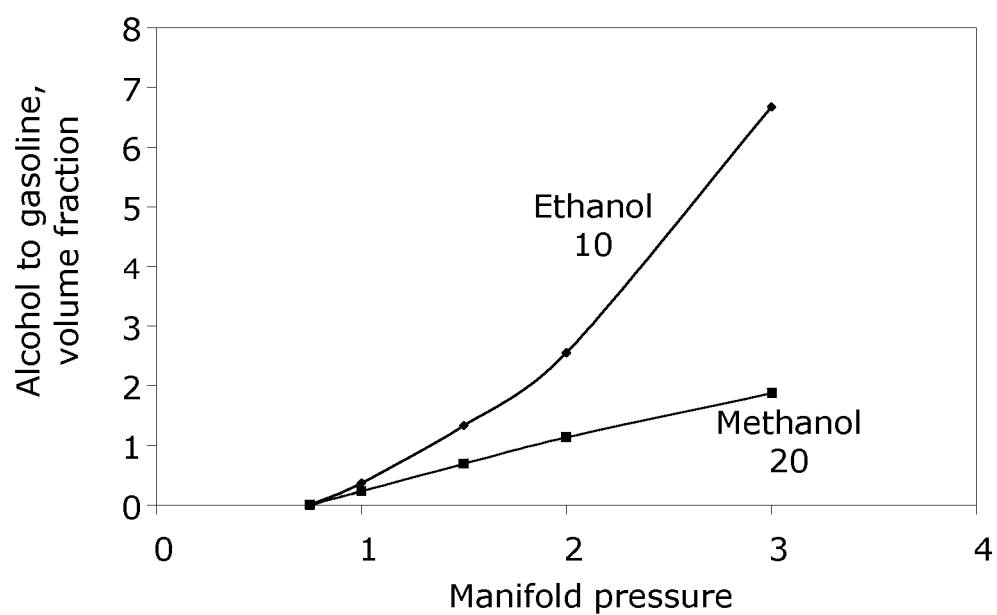
FIG. 1 compares the ethanol usage to the methanol usage needed to eliminate knock in an engine operating at 1000 RPM, and having a compression ratio of 10, as function of the manifold pressure.

The fluid (i.e. ethanol) boosted gasoline engine facilitates realization of the full potential for highly pressure boosted, high compression ratio spark ignited engine operation by greatly alleviating the knock constraint. This is accomplished by appropriately controlled direct injection of an anti-knock fluid, such as ethanol or ethanol blends, into the cylinder. Direct injection of ethanol acts as an effective powerful knock suppressant. The fraction of the fuel provided by the ethanol may be varied instantaneously according to the need for knock suppression. This need may be non-existent at low torque where knock suppression is not needed and may be as high as 100% when maximum knock suppression is needed at high torque.

In order to reduce any inconvenience of using a second anti-knock fluid, alcohol boosted operation should preferably be configured such that the driver has the option of refilling the second tank as infrequently as once every 5,000 miles, or preferably once every 10,000 miles. This replenishment interval may correspond to the regular servicing at the dealer or a garage. It would also be desirable for the driver to have the option of refilling one or more containers of alcohol, and to have this service performed either by the driver or by a service station attendant at an interval of approximately every 2,000 miles. In order to meet these goals, the alcohol consumption should be less than 2% of the gasoline consumption over a typical drive cycle.

One particular challenge for alcohol boosted operation is the large rate of alcohol consumption in applications which may require prolonged high torque operation, such as prolonged towing with a pick up truck. Therefore, it would be beneficial to define a plurality of different operating modes. For example, one mode may optimize efficiency at low torque, where only the gasoline and small amounts of anti-knock fluid are being used to fuel the engine. A second mode may be to minimize the consumption of anti-knock fluid in situations involving prolonged periods of high torque, such as towing. Other modes may also be defined.

A number of methods to reduce the consumption of the anti-knock fluid are described herein to reduce the interval for replenishment of anti-knock fluid. Methods to reduce anti-knock fluid consumption include:

Use of methanol in the second tank: the use of methanol in the secondary tank instead of ethanol can halve the boost fuel requirements.

Use of alcohol/water mixtures: Alcohol/water mixtures can substantially decrease the consumption of the anti-knock fluid. Water and alcohol/water mixtures have substantially higher heat of vaporization than the neat alcohols. Use of an alcohol/water mixture could provide about a factor of four reduction in the anti-knock fluid consumption, as compared to E85.

Engine operation modification: It is possible to decrease the alcohol consumption by modifying engine operation, such as by operating at higher revolutions per minutes (RPMs) than the engine would normally use (up-speeding) or use of charge stratification.

Aggressive spark retard: Aggressive spark retard can be used to decrease the consumption of the anti-knock fluid. Although limited spark retard has a minimal adverse effect on efficiency while decreasing the alcohol consumption, aggressive spark retard continues to decrease alcohol consumption but adversely affects the engine efficiency and increases the exhaust gas temperature.

Use of premium fuel in main tank: A decrease in the consumption rate of the anti-knock fluid in the secondary tank can be achieved if there is premium fuel in the primary tank. As premium fuel is broadly available, its use to achieve alcohol consumption reduction has minimal impact on the consumer. Use of premium fuel would be needed only for extended towing applications.

Variable Valve Timing (VVT): Variable valve timing can be used to decrease the compression ratio at conditions of high load, decreasing the tendency of the engine to knock and the amount of anti-knock fluid required.

Direct injection of gasoline and anti-knock fluid: It is possible to directly inject both gasoline and the anti-knock fluid, thereby decreasing the amount of anti-knock fluid required to prevent knock.

These techniques may be employed upon detection of a change in vehicular operating condition. "Vehicular operating condition" is defined as the prolonged operating condition of an engine over time. For example, in everyday driving, the engine may experience periods of high torque (such as acceleration) and low torque (high speed cruising). However, when viewed over an extended period, the average torque is relatively low, and therefore the consumption of anti-knock fluid is also relatively low. In contrast, when a vehicle is under high stress, such as when towing, the engine may experience high torque continuously. Thus, when viewed over an extended period of time, the average torque is much higher. This much higher average torque leads to increased consumption of anti-knock fluid. It is anticipated that brief changes in torque, such as acceleration or climbing, are not considered changes in the vehicular operating condition. Rather, it is the prolonged change in engine torque that precipitates a change in vehicular operating condition. While towing is the most common cause of prolonged high torque, other conditions may result in prolonged high torque and are within the scope of the disclosure.

Alternatively, the capacity of the second tank can be increased, thereby increasing the replenishment interval. In some embodiments, the larger amounts of anti-knock fluid may be at the expense of gasoline.

One method to reduce anti-knock fluid consumption is to use an anti-knock fluid having a higher blending octane number and which provides greater vaporization cooling than ethanol. Methanol is an attractive cooling fluid due to its greater knock suppression effect, its ready availability in containers (such as in methanol/water mixtures for windshield cleaner or as "dry gas" for prevention of fuel line freeze up), and its potential production from biomass and coal as well as from natural gas.

Methanol has a higher blending octane than ethanol (roughly 130 as compared to 110), thereby reducing its consumption as compared to ethanol.

Calculations of the ethanol consumption have been previously carried out in order to evaluate the requirements of the second fuel tank that contains the alcohol, and to develop refueling approaches. Ethanol requirements were previously calculated using a simple model, described in [Bromberg, Cohn, Heywood, Laboratory for Energy and the Environment Report LFEE-2006-01 (2006)], the disclosure of which is herein incorporated by reference in its entirety, which determines the amount of alcohol required through the engine map, and then uses a vehicle model to determine the average utilization over conventional driving cycles (HWFET, UDDS, us06). The model was then used to determine the ethanol consumption for different levels of turbocharging and compression ratios, using ethanol as the anti-knock fluid.

This model has been used to calculate the ratio of alcohol to gasoline consumption for a representative case for prolonged high torque operation. FIG. 1, which was generated using this model, shows the scenario of low RPM methanol and ethanol requirements, as a function of pressure in the inlet manifold. The conditions of FIG. 1 are for an engine speed of 1000 rpm and an engine with a compression ratio of 10. Line 10 of FIG. 1 shows the ratio of consumption of ethanol to gasoline, by volume. Line 20 shows the ratio of consumption of methanol to gasoline, by volume. It is assumed that the ethanol is E100, and the methanol is M100; while the gasoline is modeled as 87 PRF. Small dilutions of the alcohols by gasoline will not change substantially the comparison. The calculation is performed for the case of homogeneous injection of the alcohol and port fuel injection of the gasoline.

The ratio of the refueling interval of the alcohol tank to that of the gasoline tank is inversely proportional to the ratio of alcohol rate of consumption to the rate of consumption of gasoline. It should be stressed that under normal driving conditions the alcohol consumption needs to be calculated over a driving cycle. FIG. 1 shows the curves only for a given set of speed and torque, for conditions where the propensity to knock is the greatest and the alcohol requirement is consequently the highest.

For a manifold pressure of around two bar, the methanol consumption is approximately equal to that of gasoline and about half that of ethanol. Thus, using methanol should approximately double the replenishment interval of the anti-knock fluid tank. The advantage of methanol further increases at higher values of inlet manifold pressures. For example, at a manifold pressure of three bar, ethanol consumption is seven times than of gasoline, and 3.5 times that of methanol. Line 20 also shows that methanol is far less sensitive to the manifold pressure than ethanol.

The alcohol fraction under the conditions of FIG. 1 is high even with the use of methanol. This is because of the assumptions used in the calculations, for example, very low engine speeds and high torque, which are conditions that exacerbate knock. FIG. 1 shows the trends that may be expected to exist at more realistic towing conditions, at higher speeds.

In another embodiment, water can be added to the anti-knock fluid (such as ethanol or methanol) to further reduce the anti-knock fluid requirement.

Alcohol/water mixtures have substantially higher heat of vaporization than pure alcohols. Although water can have an even larger effect on the temperature, the large amounts required result in difficulty in sparking and initial flame propagation, increasing misfire.

Figure 2:
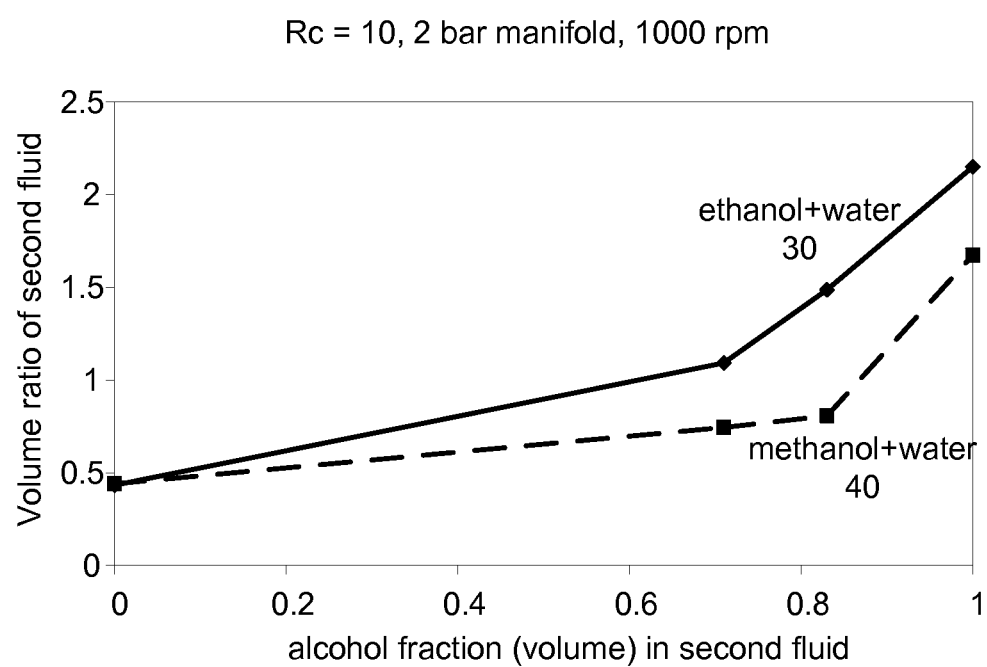
FIG. 2 compares the ethanol usage to the methanol usage, as the mixtures are diluted with water, needed to eliminate knock in an engine operating at 1000 RPM and having a compression ratio of 10.

FIG. 2 shows the required fraction of the anti-knock fluid at low engine speed and high boost pressure (2 bar absolute in the manifold) to prevent knock, using the model described in reference to FIG. 1. FIG. 2 shows the results for an ethanol/water mixture on line 30 and a methanol/water mixture on line 40. These lines represent the volume ratio of the anti-knock fluid to gasoline, as a function of the alcohol fraction. The test parameters included an engine with a compression ratio of 10, operating at 1000 RPM with 2 bar manifold pressure. The point at the far left shows the volume ratio of pure water to gasoline, while the far right shows these ratios for pure alcohols. The graph represents various levels of dilution of the alcohol/water mixture. In other words, FIG. 2 shows that, for a mixture which is 70% anti-knock fluid and 30% water, the ratio of methanol to gasoline is approximately 0.75, while the ratio of ethanol to gasoline is about 1.

The amount of pure methanol needed at all levels of dilution is less than the amount of necessary pure ethanol. Furthermore, the amount of ethanol/water or methanol/water mixtures decreases monotonically with increased water content (or more dilute alcohol mixtures). In other words, the addition of water to the mixture has two effects. First, the water replaces the anti-knock fluid, thereby reducing the amount of anti-knock fluid in the mixture. Second, the presence of water decreases the amount of the mixture needed to eliminate knock.

For example, according to line 40 on FIG. 2, about 1.5 gallons of pure methanol per gallon of gasoline are needed in this drive scenario. However, only about 0.5 gallons of anti-knock fluid are needed per gallon of gasoline at a dilution of 0.2. Therefore, it is possible to decrease the amount required by about a factor of 4.

Another approach for reducing the alcohol use is to operate the engine at higher revolutions per minutes, also known as upspeeding. Operating at higher RPMs reduces the engine's tendency to knock, and thus the alcohol requirement, due to a decrease in combustion time. These shorter combustion times reduce the time in which the autoignition of the end-gas may occur. Shorter combustion times are due to increased turbulence in the engine.

A simple model has been used to determine the effect of increased engine speed and decreased torque (for constant mechanical power from the engine). The results are shown in Table 1. The table indicates a very large decrease in ethanol consumption by operating at higher speed and lower torque, but at the same power conditions. It is assumed that combustion time also decreases with increasing engine speed. In Table 1, it is assumed that the combustion time is constant in crank-angle degrees at the higher speed conditions, which may be an optimistic condition. However, the gain is very large, and the speed of combustion is increasing, although not necessarily at the same rate as the engine speed.

TABLE 1

| Engine speed (rpm) | Manifold pressure (bar) | Ethanol consumption (ethanol/gasoline) |
|---|---|---|
| 3000 | 2 | 0.67 |
| 4000 | 1.5 | 0.08 |

In addition to the above scenario, a more detailed calculation has been carried out for a large heavy duty engine, described in [Blumberg, Bromberg, Kang, Tai, SAE 2008-01-2447], the contents of which is herein incorporated by reference in its entirety. That calculation evaluated an 11 liter heavy-duty engine at several operating points. The compression ratio used is 14. The results are shown in Table 2, for constant power. Brake Mean Effective Pressure (BMEP) is a well-known measure of an engine's capacity to do work, and is independent of its displacement. Thus, by normalizing the BMEP of these two operating conditions to an arbitrary value, the results can be properly computed. Maximum torque is achieved at 1500 rpm.

TABLE 2

| Engine (rpm) | Normalized BMEP | Ethanol consumption (E85/gasoline) | BTE |
|---|---|---|---|
| 1500 | 1.3 | 1.44 | 39.6% |
| 1800 | 1.08 | 0.64 | 36.9% |

Therefore, even in the case of the large engine model, there is a substantial decrease in the consumption of the secondary fuel by moving to higher engine speed and lower BMEP, but at approximately constant power. In the case of Table 2, the decrease in ethanol consumption is about 60 for a 20% increase in engine speed. In comparison, Table 1 showed a decrease in ethanol consumption of about 90% for a 30% increase in engine speed. The engine efficiency (or Brake Thermal Efficiency—BTE) is 39.6% for the lower engine speed and about 36.9% for the higher engine speed.

In both engines, there is a substantial decrease in ethanol consumption in conditions of medium to high power by going to higher engine speed operation.

Operation at higher engine speeds can be achieved by adjusting the powertrain gear ratios of the vehicle in order to provide the appropriate gear for towing.

For example, the operator/driver, or the boosting system controller may determine that a high torque situation exists. In one embodiment, the driver determines this, and supplies this information to the boosting system controller. This can be done using an actuator, such as a button or lever on the dashboard or gear box. This may be similar to the method used to indicate the need for four wheel drive on some automobiles, or over-drive. In other embodiments, the boost system controller determines that a high torque situation exists. This can be done by monitoring the consumption rate of anti-knock fluid being injected into the cylinders, or by monitoring the torque being generated by the engine. High torque during the vehicular operating condition can be defined an average rate of consumption of the second fluid during a given time period. The averaging time can be as short at 10 minutes and as long as 1 hour. The determination of high torque can be made based on the consumption rate being greater than a predetermined value. In another embodiment, high torque may be determined based on the ratio of the consumption rate of the anti-knock fluid to the consumption rate of the gasoline.

If this ratio exceeds a predetermined value for a time period greater than a predetermined limit, a determination of high torque is made. Alternatively, the consumption rates of anti-knock fluid and gasoline may be continuously averaged over a predetermined time period. If the ratio of the average consumption rate of anti-knock fluid to the average consumption rate gasoline exceeds a predetermined threshold, a determination of high torque is made.

Figure 5:
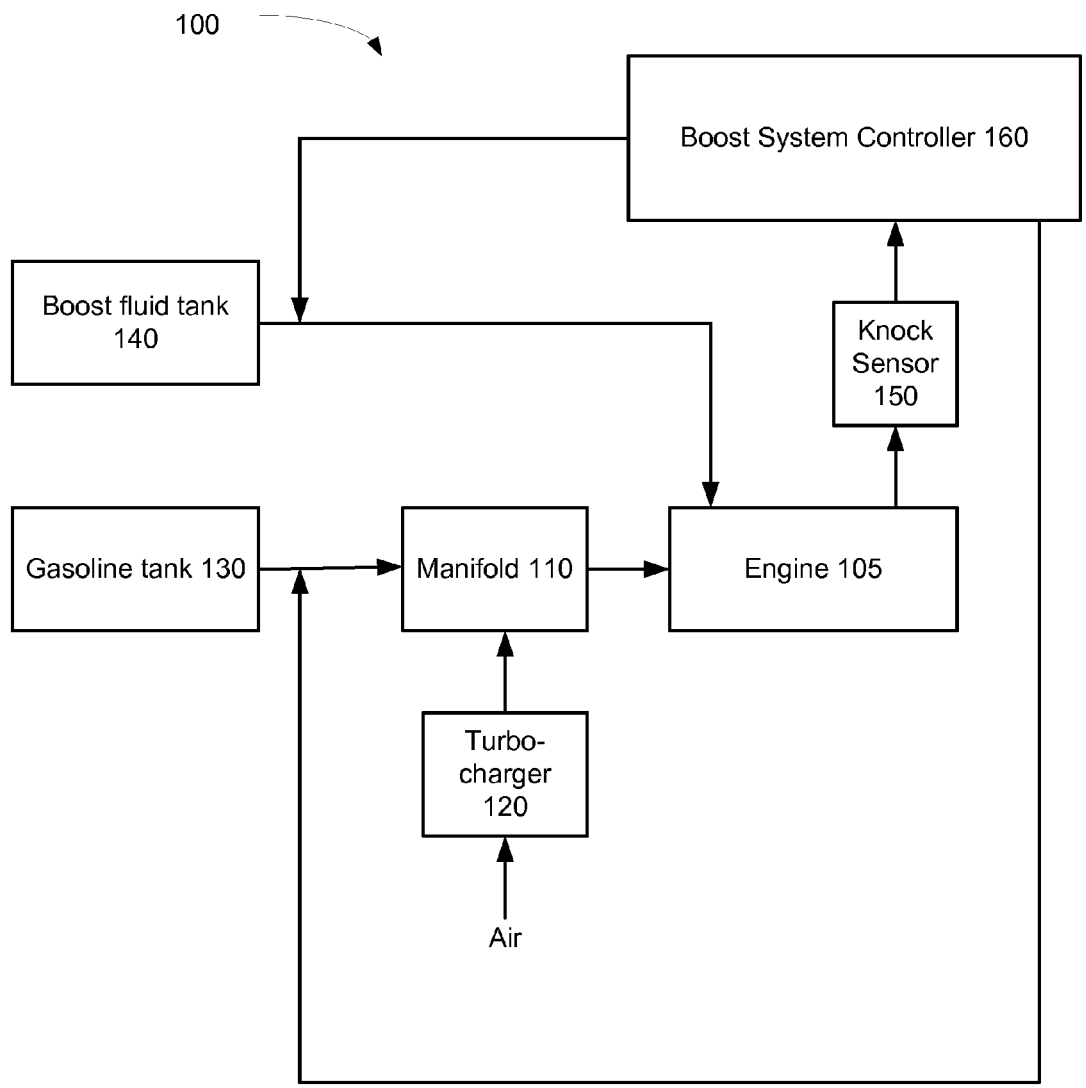
FIG. 5 shows a boost system.
Figure 6:
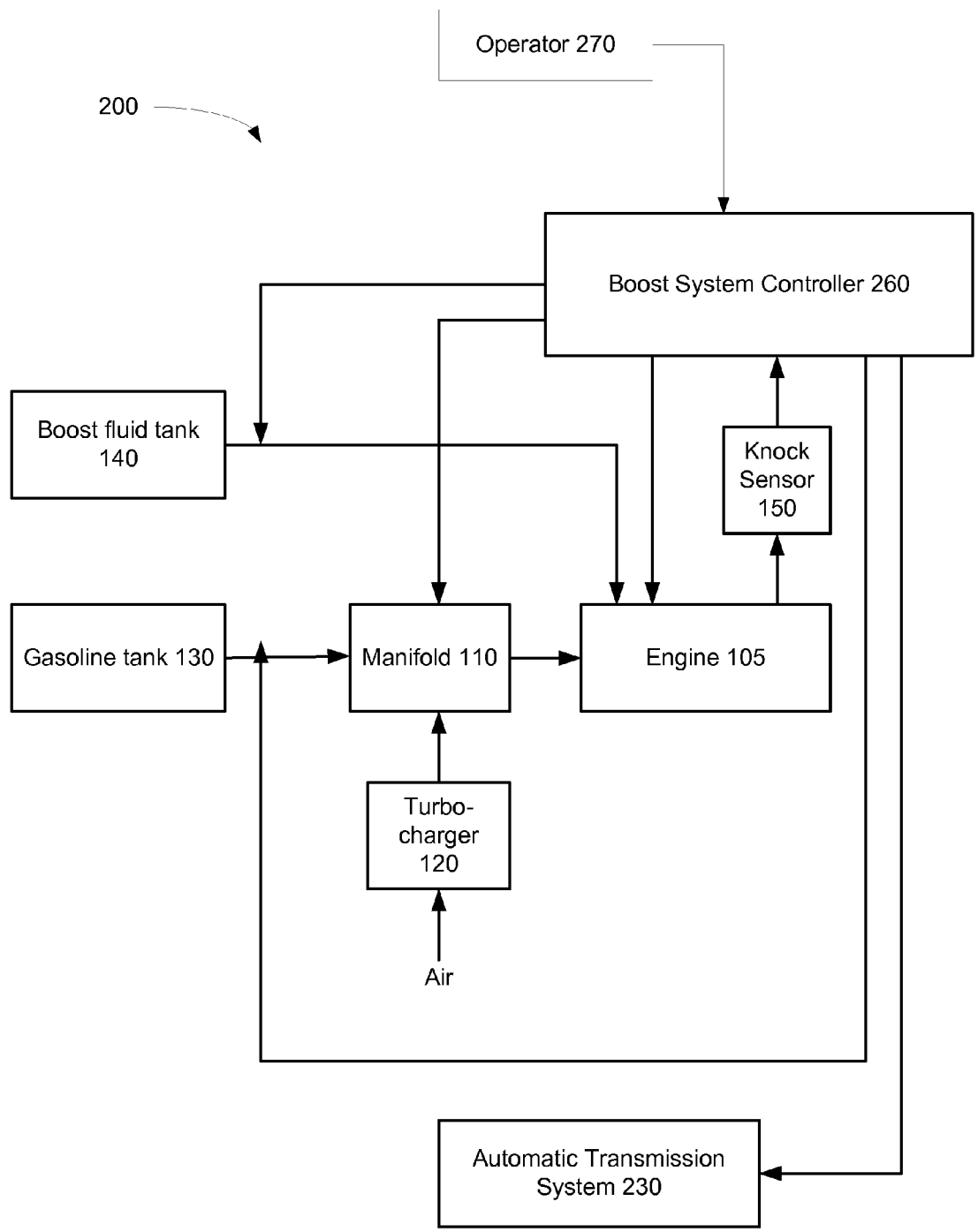
FIG. 6 shows the boost system of FIG. 5, as modified to reduce anti-knock fluid consumption.

FIG. 6 shows a boost system 200 used in one embodiment. Those components with the same function as used previously in FIG. 5 are given like numbers. In this embodiment, the boost system controller 260 receives various inputs, such as a signal from the boost sensor 150 and from the operator 270. Based on these inputs, the boost system controller 260 determines that the amount of anti-knock fluid being used is above a predetermined threshold, which indicates a high torque situation. Once a high torque situation has been determined, the boosting system controller 260 may signal the automatic transmission system 230. This signal would inform the automatic transmission system 230 to shift to a lower gear, so as to increase the engine speed while decreasing the torque. Methods to affect such a change are well known, and are currently used in response to various situations, such as acceleration and uphill driving.

The boosting system allows higher torque operation at lower RPMs than conventional engines. Therefore, it may also be desirable to introduce a different gear ratio for the top gear. This gear ratio would allow lower engine speed at a given vehicle speed, thereby minimizing gasoline consumption for highway driving, but increasing use of the secondary fluid. Such a gear ratio may be such that the ratio of engine speed to vehicle speed is about 25-30% lower in top gear than is now customary. This gearing would be used in normal cruising (lightly loaded vehicle), and is an effective tool for increasing the vehicle fuel economy.

Another method of reducing the amount of anti-knock fluid needed in high torque situations is the use of charge stratification of the secondary fluid as a means of controlling knock. Autoignition of the gas typically occurs away from the spark, typically at the far end, or along the walls, of the cylinder. Therefore, it is most essential that the anti-knock fluid be added to these regions of the cylinder towards the end of the combustion phase, while it is less important that it reach the center or lower portion of the cylinder. One method to stratify the charge is to introduce the anti-knock fluid late in the engine cycle, so that it does not dissipate fully before the spark ignition. Although late injection is a way to produce charge stratification, it is advantageous to inject early (and to have evaporation take place after inlet-valve-closing) to make the best use of the high heat of vaporization of the anti-knock fluid in order to maximize the decrease of end-gas temperature.

One way to maintain charge stratification may be to inject the alcohol in the periphery of the cylinder, with substantial air swirl but little or preferably no tumble. In this case, thermal stratification can be used to maintain the charge stratification. The heavier, cooler air/fuel mixture will stay in the periphery of the cylinder by centrifugal forces due to the strong swirl.

Figure 3:
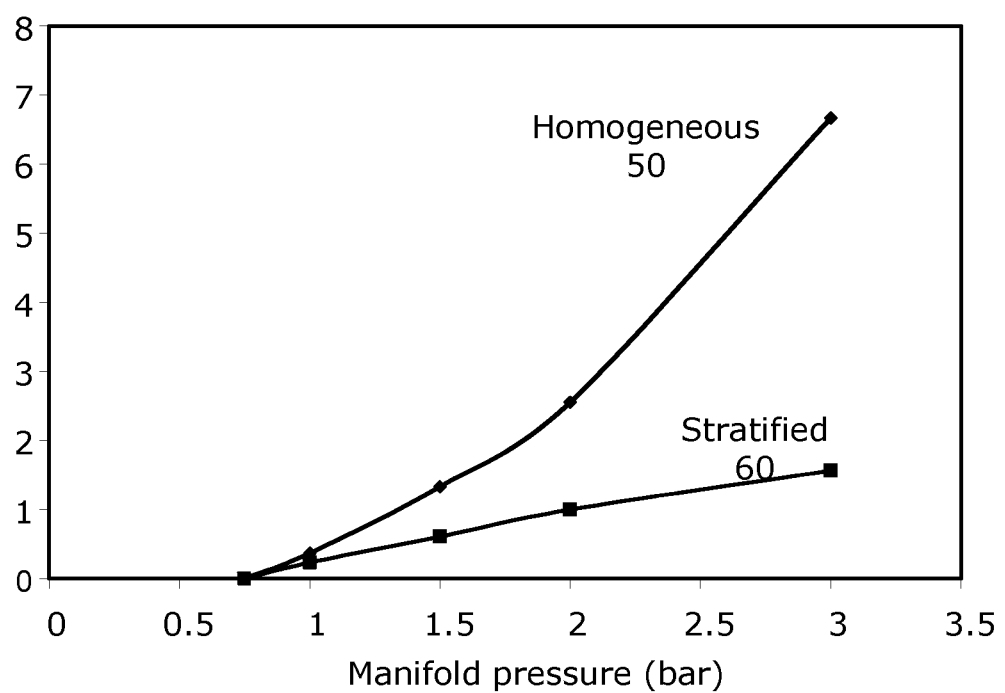
FIG. 3 compares the ethanol usage needed to eliminate knock as a function of manifold pressure for homogeneous and stratified charging.

Charge stratification decreases the amount of ethanol required (as a fraction of the gasoline required) by about a factor of 2 at manifold pressures of about 2. FIG. 3 demonstrates this trend. Line 50 shows the amount of ethanol needed to eliminate knock in a homogenous cylinder, while line 60 shows the amount needed if the ethanol is stratified. It should be noted that the consumption of ethanol has been substantially reduced, and the savings increase at higher manifold pressures. Furthermore, the large cylinders in heavy duty vehicle engines allow for better stratification of the ethanol.

Another method that can be used to substantially decrease the anti-knock fluid consumption is spark retard, which can be accomplished with very small effect on fuel efficiency. Tests have shown that a 7 degree retard in Crank Angle (CA) in spark time from MBT (Maximum Brake Torque) decreases the engine efficiency (as measured by BTE) by slightly over one percent. However, it also results in a significant reduction in the amount of ethanol used. Table 3 shows the results, where the engine conditions correspond to the B100 point in the ESC (European Stationary Cycle) mode test, corresponding to intermediate speed (1547 rpm) and maximum torque at that speed (in this case, 32.9 bar BMEP), as described in [Blumberg, Bromberg, Khan and Tai, SAE 2008-01-2447], the disclosure of which is herein incorporated by reference in its entirety.

TABLE 3

| | CA10-90 (CA deg) | CA50 (CA deg) | BTE | E85/gasoline ratio (by vol) |
|---|---|---|---|---|
| MBT | 25 | 8 | 42.5% | 11.7 |
| Moderate spark retard | 25 | 14.5 | 41% | 2.54 |
| Aggressive retard | 25 | 24 | 38% | 1.1 |

Three scenarios are presented in Table 3, and include the MBT case, moderate spark retard and aggressive spark retard. The combustion speed (noted as CA10-90, the duration, in crank-angle (CA) degrees, between combustion of 10% and 90% of the fuel) has been held constant. CA50 indicates the timing (in crank angle after Top Dead Center, where 50% of the fuel has been consumed. However, the timing of peak pressure is changed because of the spark retard. As mentioned before, moderate spark retard does not affect the efficiency significantly, changing the BTE from 42.5% to 41%. Further increases in spark retard drop the BTE to about 38%. However, the moderate spark retard dramatically decreases the ethanol/gasoline ratio (by volume), from about 12-to-1 at MBT to about 2.5-to-1. The moderate spark retard results in boost consumption ratio being reduced by a factor of 4.5. Further retardation of the spark to 24 degrees further decreases the ethanol consumption by another factor of 2 and the absolute ethanol consumption by about a factor of ⅓.

Aggressive spark retard can be optionally used under conditions of prolonged high torque operation. The initiation of spark retard can be implemented by the operator 270 or the boost system controller 260 as described above. FIG. 6 shows the boost system controller 260 supplying an input to engine 105. This input is used to instruct the engine 105 to introduce spark retard, and optionally to specify the amount of retard to be used (e.g. moderate or aggressive).

Another method of reduce the consumption of anti-knock fluid is by increasing the ratio of gasoline to air in the vehicle (also known as rich operation). Rich operation can be used to extend the knock free region in conventional and directly injected engines.

Table 4 shows the effect of increased fuel-to-air ratio (expressed as equivalence ratio, $\Phi$, which is the ratio between the fuel-to-air ratio divided by the fuel-to-air ratio at stoichiometric combustion). In other words, an equivalence ratio, $\Phi$, indicates normal or typical operation, while a value of 1.1 indicates a 10% increase in the amount of fuel in the fuel-air mixture. Table 4 is calculated at the B100 point, corresponding to about 1547 rpm and 32.9 bar BMEP.

TABLE 4

| Φ | ethanol/gasoline ratio (by vol) | BTE |
|---|---|---|
| 1 | 2.60 | 41.0% |
| 1.05 | 2.49 | 39.4% |
| 1.1 | 2.20 | 37.5% |
| 1.15 | 1.95 | 35.7% |

Although not as strong reduction as some of the other means described, there is still a 20% reduction in ethanol consumption ratio by going to enrichments of Φ~1.1, with a decrease in fuel efficiency, as not all the energy of the fuel is consumed. If this mode of operation is used sporadically, the average fuel consumption of the vehicle should not be significantly impacted, but it allows the operator the flexibility of being able to reduce the consumption of the secondary tank fluid at the expense of increased consumption of the main tank for short periods of time. Note that increases in Φ adversely affect engine efficiency (as measured by BTE). As with other parameters, changes in the composition of the gasoline/air mixture can be determined by the driver 270 or the boost system controller 260. FIG. 6 shows an input to the manifold 110 from the boost system controller 260, which can be used to alter the gasoline/air mixture, as necessary.

The use of premium fuel can also be used to reduce the rate of utilization of the alcohol fuel. The effect of using premium in comparison to regular octane gasoline is summarized in Table 5.

TABLE 5

| Gasoline octane | ethanol/gasoline ratio (by vol) |
|---|---|
| 87 | 1.56 |
| 93 | 1.44 |

The results of Table 5 were calculated for an engine speed of 1000 rpm and 2 bar inlet manifold pressure. These are the worst conditions for knock in a spark ignited engine. The gasoline was modeled using primary reference fuels (iso-octane and n-heptane), Two values of gasoline octane were investigated, 87 (corresponding to regular gasoline) and 93 (corresponding to premium). The ratio of ethanol to gasoline consumption was slightly decreased, by about 10%, by the use of higher octane gasoline.

Another method to conserve anti-knock fluid is by variation of the compression ratio. The knock limit results in severe limitation to the allowable compression ratio in spark ignited engines. The use of directly injected anti-knock fluids can prevent knock, thereby allowing higher compression ratios. While higher compression ratios result in increased fuel economy, they may also require larger amounts of anti-knock fluid to operate properly.

In situations where anti-knock fluid should be conserved, it is possible to decrease the maximum compression ratio, either with variable compression ratio or with variable valve timing (VVT).

Variable compression ratio may be achieved through the use of cylinders with an adjustable volume. In some embodiments, the cylinder head can be adjusted, allowing the volume within the cylinder to change.

Variable valve timing is a means to control the point in time (relative to the piston stroke) at which air and exhaust enter and exit the cylinder. By modifying this timing, it is possible to effectively change the compression ratio.

Figure 4:
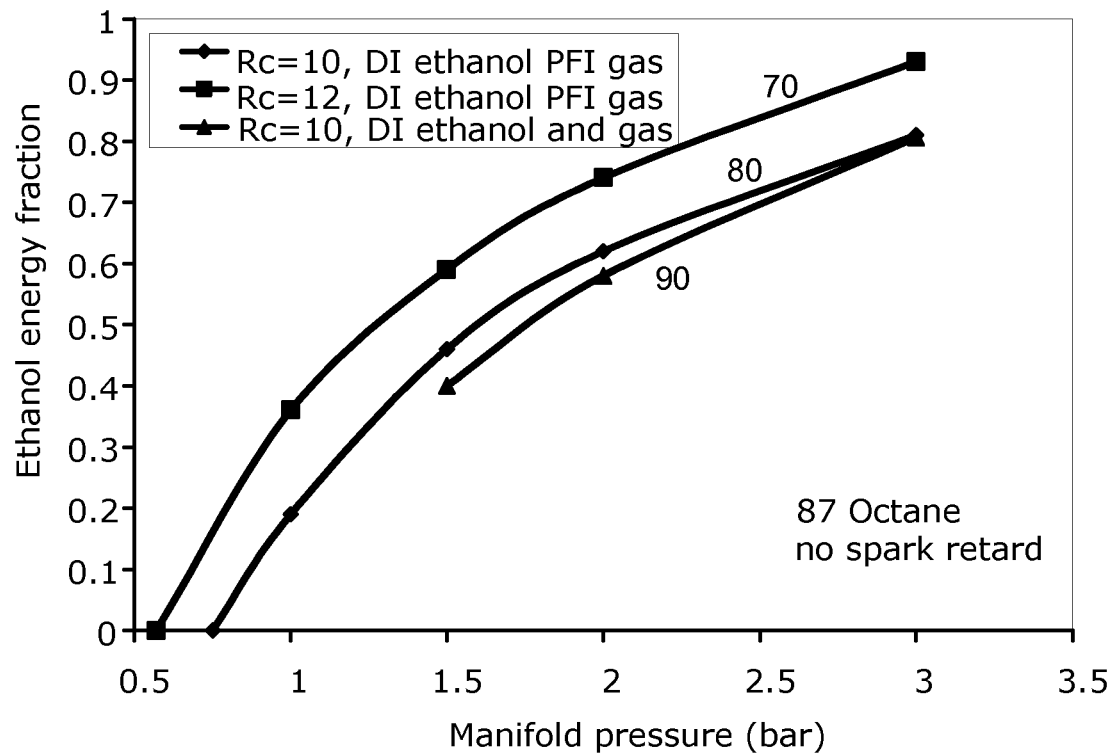
FIG. 4 compares ethanol usage needed to eliminate knock for two different compression ratios and for direct injected gasoline, for an engine operating at 1000 RPM.

The ethanol requirement as a function of the manifold pressure is shown in FIG. 4 for two different values of compression ratio. Line 70 represents the ethanol fraction required to eliminate knocking at a compression ratio of 12. Line 80 represents the ethanol fraction required to eliminate knocking at a compression ratio of 10. From these lines, it can be seen that the amount of ethanol required is decreased by about 15% when the compression ratio is decreased from 12 to 10. Further decreases in compression rate would yield further ethanol savings.

To effect this change, the driver 270 or boost system controller 260 may determine that high torque or towing conditions exist, and signal this status to the engine, as described above. FIG. 6 shows one or more inputs to the engine 105 from the boost system controller 260. This set of inputs can be used for spark retard timing (as described above), variable valve timing, variable compression ratio modification, or any combination thereof.

Another method to extend the replenishment interval for anti-knock fluid is through direct injection of gasoline. Although the cooling effect of directly injected gasoline is substantially lower than that of the alcohols, the use of directly injected gasoline also results in a reduction in the consumption of anti-knock fluid. The use of combined direct injection of ethanol and gasoline is shown in line 90 in FIG. 4, for an engine with a compression ratio of 10. Separate injectors for gasoline and anti-knock fluid may be relatively easy to implement in the large cylinders used for heavy duty vehicle engines. In some embodiments, gasoline can be direct injected into the cylinder.

While the above methods and systems are concerned with minimizing anti-knock fluid consumption, another approach is to increase the anti-knock fluid capacity in the vehicle. In one embodiment, a towing package option is provided that would include another tank for anti-knock fluid. This additional tank would be in addition to the anti-knock fluid storage tank that is part of the standard package. This second anti-knock fluid tank could increase the ethanol storage capacity by a factor of two and thus the alcohol refill interval by a factor of two.

Figure 7:
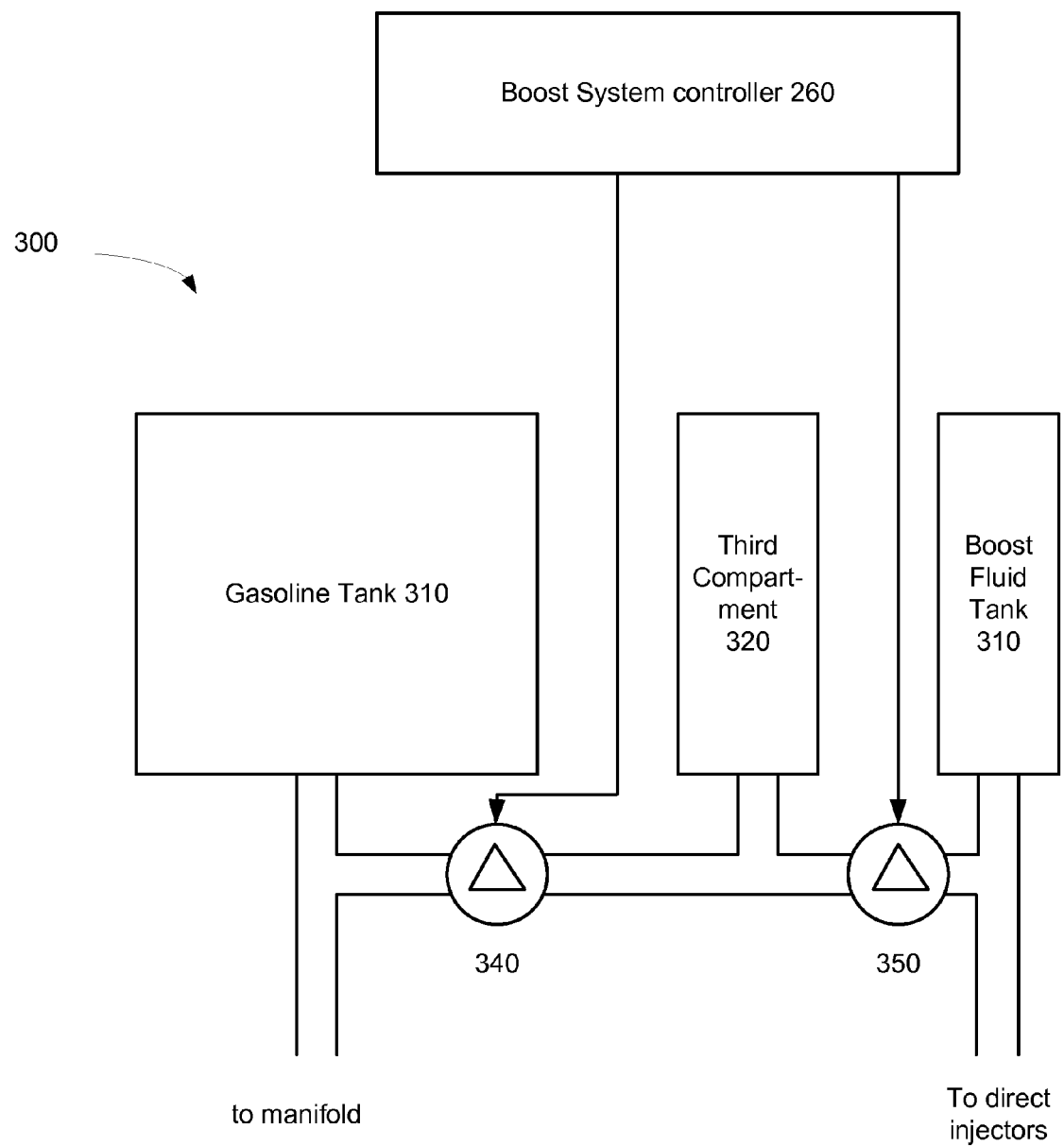
FIG. 7 shows a three compartment fuel storage system to increase anti-knock fluid replenishment time.

In another embodiment, shown in FIG. 7, a fuel tank system 300 with three compartments where one of the compartments can be filled with different fuels can be used. The first tank 310 is filled with gasoline. The second tank 320 is used for anti-knock fluid for the octane boosting. The third compartment 330, which can be connected with either the first or second tanks, is filled with either gasoline or ethanol. In some embodiments, the third compartment 330 is connected to the gasoline tank 310 such as with a valve 340. Similarly, third compartment 330 may be connected to anti-knock fluid tank 320 via a second valve 350. In ordinary driving conditions where anti-knock fluid consumption is relatively low, the third compartment 330 is connected to the first tank 310 and is filled with the same filling system as the first tank 310. Under conditions of prolonged towing, the third compartment 330 is connected to the second tank 320 and filled with the same filling system as the second tank 320. The selection of which tank the third compartment should be connected to may be made by the boost system controller 260. In one embodiment, outputs from the boost system controller 260 are used to provide input to valves 340, 350. This determination may be based on prior driving habits. In another embodiment, the selection of which tank the third compartment should be connected to is made by the driver, who is aware of whether the vehicle will experience a prolonged period of high torque usage.

When the third compartment 330 is used to store gasoline, gasoline is first consumed from the third compartment 330 before it is consumed from the first tank 310. In this way, the third compartment 330 becomes available for filling with anti-knock fluid as quickly as possible. Even if the third compartment 330 contains some amount of gasoline, refilling it with anti-knock fluid can extend the refill interval for the second tank 320.

If the second tank 320 and third compartment 330 each have the same volume, the anti-knock fluid refill time can be increased by a factor of two by using both tanks to store alcohol, at the expense of the need to refill the gasoline tank 310 more often.

Each of the methods and systems described above can be used to increase the replenishment interval for anti-knock fluid. Each method can be used alone, or in conjunction with one or more other methods. Thus, the savings described in for each method may be multiplied to achieve even higher overall savings.

While ethanol has been described in some portions of the specification, it is to be understood that ethanol and methanol blends are also covered. The blending agents could be water and/or gasoline, or other fluids for lubrication, freeze-prevention or improved blending. Furthermore, while the specification describes the use of gasoline in spark ignited vehicles, it is to be understood that natural gas and other fuels that operate with spark ignited engines can also be embodied with the present invention.

What is claimed is:

1. A spark ignition engine system, where a first fluid is introduced into said engine from a first source and a second fluid is directly injected into said engine from a second source and wherein the ratio of said second fluid to said first fluid varies with engine torque so as to prevent knock, comprising:
   a controller configured to modify the operation of said engine so as to reduce an amount of said second fluid that would otherwise be used to prevent knock, based on a change in vehicular operating condition, wherein said change comprises prolonged use at high torque.

2. The spark ignition engine system of claim 1, wherein said change in vehicular operating condition is due to prolonged towing.

3. The spark ignition engine system of claim 1, wherein said modification comprises an increase in spark retard timing.

4. The spark ignition engine system of claim 1, wherein said modification comprises use of variable valve timing.

5. The spark ignition engine system of claim 1, wherein said first fluid is mixed with air prior to being introduced into said engine and said modification comprises a change in the ratio of said first fluid to air.

6. The spark ignition engine system of claim 1, wherein said modification comprises an increase in RPM.

7. The spark ignition engine system of claim 1, further comprising a transmission, wherein said controller instructs said transmission to upspeed.

8. The spark ignition engine system of claim 1, wherein said modification comprises charge stratification, wherein a non-uniform distribution of said second fluid is directly injected into said engine.

9. The spark ignition engine system of claim 1, wherein an operator provides input to said controller regarding said change to said vehicular operating condition thereby causing said controller to modify said operation of said engine.

10. The spark ignition engine system of claim 1, further comprising a knock sensor, wherein said knock sensor provides input to said controller to modify said operation of said engine.

11. The spark ignition engine system of claim 1, wherein said change in vehicular operating condition is determined based on the consumption rate of said second fluid.

12. The spark ignition engine system of claim 11, wherein said consumption rate is averaged over a predetermined time period.

13. The spark ignition engine system of claim 1, wherein said change in vehicular operating condition is determined based on the ratio of the consumption rate of said second fluid to the consumption rate of said first fluid.

14. The spark ignition engine system of claim 1, wherein said modification to said engine operation lowers the efficiency of said engine with respect to said first fluid.

15. The spark ignition engine system of claim 1 where said second fluid comprises alcohol.

16. The spark ignition engine system of claim 1 where said second fluid comprises water.

17. The spark ignition engine system of claim 1 where said first fluid comprises gasoline.

18. The spark ignition engine system of claim 1 where said first fluid comprises natural gas.

19. The spark ignition engine system of claim 1 wherein said modification comprises increased spark retard and upspeeding.

20. The spark ignition engine system of claim 1, wherein said second fluid comprises alcohol and said modification comprises direct injection of water with said second fluid.

21. The spark ignition engine system of claim 1, wherein said first fluid comprises premium gasoline.

* * * * *